AUCTIONEERING CIRCUITRY

Filed March 31, 1960

WITNESSES

John C. Healy Jr.

James F. Young

INVENTORS
Wolfgang M. Kendziorek &
Samuel J. Garrett
BY
Paul E. Friedemann
ATTORNEY United States Patent Office 3,103,594
Patented Sept. 10, 1963

3,103,594
AUCTIONEERING CIRCUITRY

Wolfgang M. Kendziorek, Monroeville, and Samuel J. Garrett, Wilkins Township, Allegheny County, Pa., assignors to Westinghouse Electric Corporation, East Pittsburgh, Pa., a corporation of Pennsylvania Filed Mar. 31, 1960, Ser. No. 18,949
4 Claims. (Cl. 307—88)

Figures 1, 2:
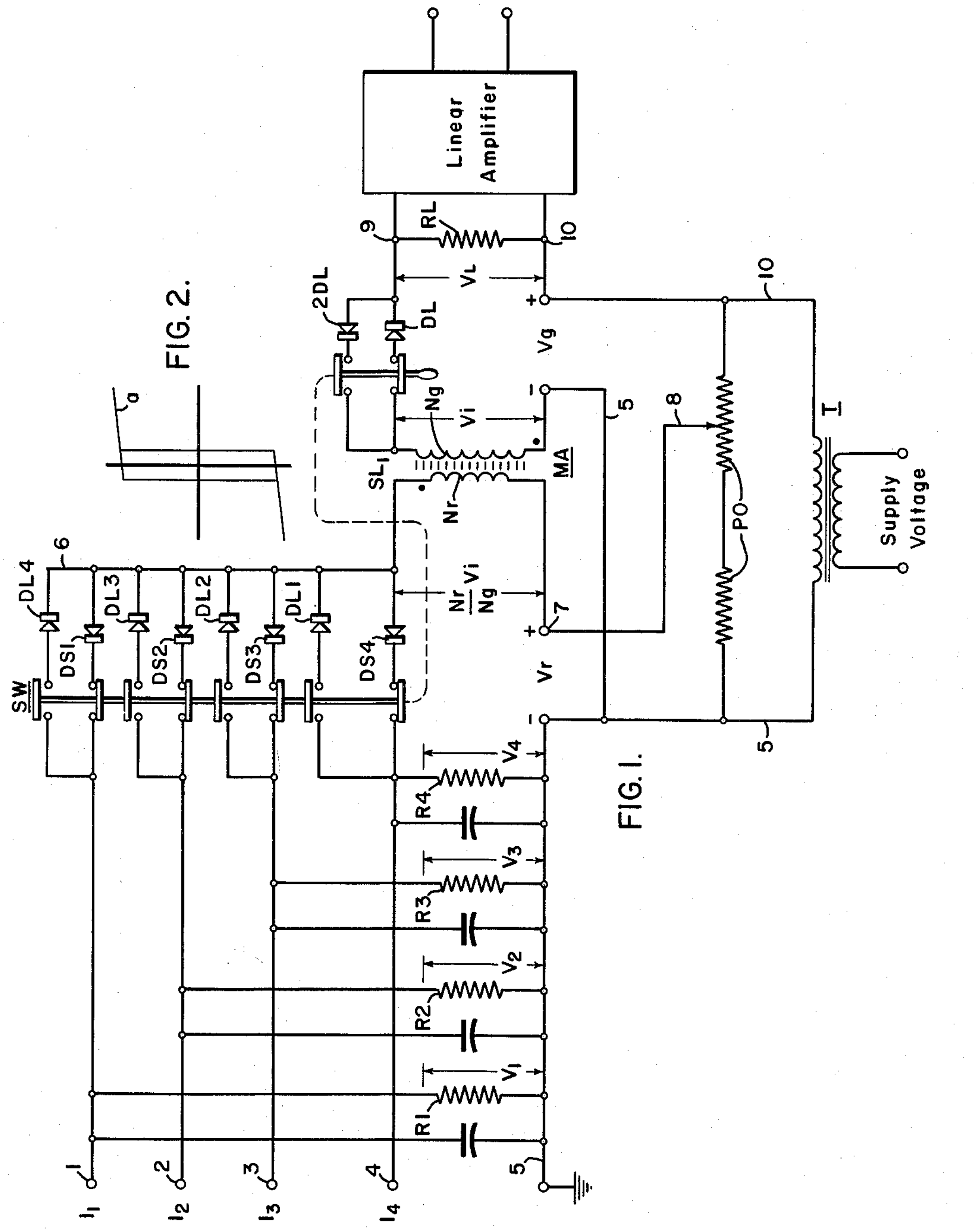

This invention relates to electric circuitry known in the trade as auctioneering circuitry.

The normal auctioneering circuit is one in which the highest of two or more signals determines the output signal. A circuit is also known wherein the lowest signal of a plurality of signals determines the output signal.

The known circuitry was, however, found not to satisfy the demands of modern systems with regard to output range, linearity, and accuracy. To meet the exacting demands of present-day electrical control systems the circuitry herein disclosed was developed.

One object of this invention is the provision of auctioneering circuitry having an increased accuracy over heretofore known auctioneering circuitry.

Another object of this invention is the provision of auctioneering circuitry having increased accuracy and linearity.

It is still a further object of this invention to provide auctioneering circuitry having increased accuracy and linearity and a faster response time than auctioneering circuitry heretofore known.

It is an object of this invention to provide so-called auctioneering circuitry wherein selectively either the lowest input signal or the highest input signal controls the output of the circuitry.

The objects stated are merely illustrative. Other objects and advantages will become more apparent from a study of the following specification and the accompanying drawing, in which FIGURE 1 shows an auctioneering circuit selectively responsive either to the lowest current signal or the highest current signal; and FIG. 2 shows a curve illustrating the magnetic characteristics of the core material of the magnetic amplifier MA shown in FIG. 1 directly below the curve shown by this figure.

In FIG. 1 the current input signals of different magnitudes are supplied across terminals 1, 2, 3, 4, and the ground terminal 5. The invention is not limited to four input signals but for the scope of simplicity, circuitry for only four current input signals, as $i_1$, $i_2$, $i_3$ and $i_4$, are shown in FIG. 1.

Resistors $R_1$, $R_2$, $R_3$ and $R_4$ are connected across the respective pairs of input terminals comprising 1 and 5, 2 and 5, 3 and 5, 4 and 5, respectively.

Assuming the selector switch SW is in the position shown, then the diodes DS1, DS2, DS3, and DS4 used for selecting the lowest input signal as the controlling signal are connected in the circuit as shown and are poled as indicated. When the selector switch SW is moved to its lower operative position, then the diodes DL4, DL3, DL2 and DL1 used for selecting the highest input signal as the controlling signal, are connected in the circuit as shown and are poled as indicated.

For maximum linearity, the diodes should have a maximum continuous operating current rating that is only slightly greater than the expected maximum value of signal current. This will assure diode operation in the most linear portion of its characteristic curve.

The common or intermediate conductor 6 for the diodes is connected in a series circuit including conductor 6, the reset winding $N_r$ of the magnetic amplifier MA, a selected portion of the potentiometer PO to the ground conductor 5. The potentiometer PO is connected across the secondary winding of the transformer T, representing the supply voltage.

The reset voltage $V_r$ for the magnetic amplifier MA is adjustable and is determined by the position of the tap 8 on the potentiometer PO.

The gating winding $N_g$ is connected in a circuit that may be traced from the ground conductor 5, which ground terminal is also the left-hand terminal of the secondary winding of the voltage supply transformer T, through the gating winding $N_g$, the diode DL, terminal 9, load resistor RL, terminal 10, all of the sections of the potentiometer PO to the ground terminal 5. The gating voltage $V_g$ is thus determined by the potential across the terminals 5 and 10. A filter, to dampen out ripples in each of the input signals, such as the capacitors shown, may be connected across each of the resistors.

In the following discussion the algebraic terms used have the following meanings:

The direct current input signal currents at terminals 1, 2, 3 and 4 are designated $i_1$, $i_2$, $i_3$, and $i_4$, respectively.

The gating voltage, reset voltage and the voltage drop across the gating windings, are designated $V_g$, $V_r$, and $V_i$, respectively. Reference characters $R_1$, $R_2$, $R_3$, and $R_4$ refer to the resistors as well as the resistance values of these resistors.

$K$ is a proportionality constant.
$N$=coil turns.
$N_r$=effective coil turns of the reset winding and also designates the reset winding.
$N_g$=effective coil turns of the gating winding and also designates the gating winding.
$\phi_s$ designates the saturating flux and $\phi_p$ designates the flux level after resetting.
$f$ designates the frequency of the alternating current.

When the selector switch SW is in the position shown the circuitry is arranged for auctioneering the lowest input signal.

To understand the operation, let the assumption be that the core SL1 of the magnetic amplifier MA is at positive saturation, as at point "$a$" on the curve shown in FIG. 2, and that $i_1<i_2=i_3=i_4$.

The alternating current gating voltage, $V_g$, is blocked during the first half cycle by the rectifying diode DL. As the alternating current reset voltage, $V_r$, increases the rectifying diodes DS1, DS2, DS3, and DS4 block any current flow until $V_r$ becomes equal to the voltage $V_1$, or $i_1R_1$. Hence, for proper operation, $V_1$ must be less than $V_r$ for part of the reset half cycle. For any values of the reset voltage that are equal to $V_1$, namely, the voltage drop across resistor $R_1$, or greater than this voltage drop of $i_1R_1$, the diode DS1 conducts and in consequence the voltage $V_1$ is common to conductors 1 and 6.

Since $i_1$ is assumed to be the smallest input signal, $V_1<V_2=V_3=V_4$. Therefore, the voltage across the diodes DS2, DS3, and DS4 will be $V_1—V_2$, $V_1—V_3$, and $V_1—V_4$, respectively. In view of the polarity of the voltage across these rectifying diodes DS2, DS3, and DS4, these diodes will be blocking. The voltage across the reset winding $N_r$ is thus given by:

$$(1) \qquad \frac{N_r}{N_g}V_i=V_r-V_i=KN\frac{d\phi}{dt}$$

Taking the half cycle average value, $$(2) \qquad \frac{N_rV_i}{N_g}\text{ avg.}=V_r\text{ avg.}-V_1\text{ avg.}=K2N_r(\phi_p-\phi_s)f$$

On the next, or gating, half cycle $V_r$ is blocked by the diodes DS1, DS2, DS3, and DS4. The half cycle average value of the load voltage is given by:

$$(3)\quad V_L \text{ avg.} = V_g \text{ avg.} - V_i \text{ avg.} = V_g \text{ avg.} - K2N_g(\phi_s - \phi_D)f$$

By substituting from Equation 2 into Equation 3:

$$(4)\quad V_L \text{ avg.} = V_g \text{ avg.} - \frac{N_g}{N_r}(V_r \text{ avg.} - V_1 \text{ avg.})$$

Since $V_r$ is a variable that can be readily selected to be of any desirable value, as by suitable adjustment of the tap 8 on the potentiometer PO, it is apparent that $$\frac{N_g V_r \text{ avg.}}{N_r}$$

can be selected to be equal to $V_g$ avg., that is:

$$(5)\quad \frac{N_g V_r \text{ avg.}}{N_r} = V_g \text{ avg.}$$

Then, by substituting from Equation 5 in Equation 4:

$$(6)\quad V_L \text{ avg.} = \frac{N_g V_r \text{ avg.}}{N_r} - \frac{N_g V_r \text{ avg.}}{N_r} + \frac{N_g}{N_r} V_1 \text{ avg.}$$

or $$V_L \text{ avg.} = \frac{N_g V_1 \text{ avg.}}{N_r} = \frac{N_g i_1 R_1}{N_r}$$

Thus, the average output voltage appearing across terminals 9 and 10 varies directly as the average value of the lowest input signal current.

The output voltage is amplified by the linear amplifier shown and is used for whatever control purpose needed.

This circuitry disclosed provides a circuit that senses the lowest of two or more electrical signals, amplifies the selected signal, and transmits the amplified signal to indicating, controlling or recording means.

For the particular application made of this invention the resistance value of each of the resistors $R_1$, $R_2$, $R_3$ and $R_4$ was 400 ohms, and $R_L$ 1,000 ohms. The diodes were all type IN459. The resistance value of the potentiometer was 400 ohms for the left-hand section and 250 ohms for the right-hand section.

The circuitry with a reversal of the diodes DS1, DS2, DS3 and DS4, or the substitution, by suitable operation of the selector switch SW, of diodes DL1, DL2, DL3, DL4, and 2DL, and other minor changes, the man skilled in the art can make, in the light of the present disclosure, the circuit senses the highest of two or more electrical signals to effect indication or control similar to auctioneering of the lowest signal.

Further, only static components, as silicon or selenium diodes and magnetic amplifiers are used to perform the auctioneering operation.

The comparison of this auctioneering circuit with heretofore known auctioneering circuits revealed that increased reliability and increased accuracy, linearity and faster response times are obtained.

While the auctioneering circuitry disclosed involves one embodiment, this invention is not limited to the subject matter shown. In the light of this disclosure, changes in details of construction and the combination and arrangement of parts may be made without departing from the scope and spirit of this invention.

We claim as our invention:

1. In an auctioneering circuit wherein the lowest electrical input signal of two or more input signals determines the output voltage, in combination, a magnetic amplifier having a gating winding and a reset winding, a common terminal, a common conductor, a load diode, a load unit, an output conductor, a first separate terminal, a second separate terminal, the reset winding being connected across the common conductor and the first separate terminal, the gating winding and the load diode being connected in series are connected across the common terminal and the output conductor with the load diode being connected to conduct toward the output conductor, said load unit being connected across the output conductor and said second separate terminal, a plurality of parallelly connected input circuits each comprising a diode, an input terminal, and an impedance connected across the common conductor and the common terminal, with the diodes connected to conduct away from the common conductor, said second separate terminal and common terminal being energized by an alternating current of a selected frequency and a voltage selected to drive the core of the magnetic amplifier well into positive saturation during the gating half cycle, said first separate terminal and common terminal being energized from the same source of alternating current supplied to the second separate terminal and common terminal but at a voltage determined by the magnitude of the smallest input signal supplied to the input terminals.

2. In an auctioneering circuit wherein the lowest electrical input signal of two or more input signals determines the output voltage, in combination, a magnetic amplifier having a gating winding and a reset winding, a common terminal, a common conductor, a load diode a load unit, an output conductor, a first separate terminal, a second separate terminal, the reset winding being connected across the common conductor and the first separate terminal, the gating winding and the load diode being connected in series, are connected across the common terminal and the output conductor with the load diode being connected to conduct toward the output conductor, said load unit being connected across the output conductor and said second separate terminal, amplifying means connected to said load unit, output circuitry connected to said amplifying means, a plurality of parallelly connected input circuits each comprising a diode, an input terminal, and an impedance connected across the common conductor and the common terminal, with the diodes connected to conduct away from the common conductor, said second separate terminal and common terminal being energized by an alternating current of a selected frequency and a voltage selected to drive the core of the magnetic amplifier well into positive saturation during the gating half cycle, said first separate terminal and common terminal being energized from the same source of alternating current supplied to the second separate terminal and common terminal but at a voltage determined by the magnitude of the smallest input signal supplied to the input terminals.

3. In an auctioneering circuit wherein the lowest electric input signal of two or more input signals determines the output voltage, in combination, terminals energized with an alternating current of a selected potential, rectifying means, a magnetic amplifier having a gating winding operatively connected to said terminals and to said rectifying means which is poled to conduct when energized with alternating current only during the gating half cycle, potentiometer means connected to said terminals, a plurality of rectifying diodes operatively connected in parallel having one type of electrode commonly connected, each of said rectifying diodes being provided with an input terminal at the other electrode, a reset winding operatively connected to said potentiometer means and to said plurality of diodes, said plurality of rectifying diodes being poled so that said reset winding conducts when energized with alternating current only during the resetting half cycle, with the time period of conduction being determined by the relationship of the smallest input signal supplied to one of said input terminals and the voltage selected by said potentiometer means.

4. In an auctioneering circuit wherein the lowest electric input signal of two or more input signals determines the output voltage, in combination, terminals energized with an alternating current of a selected potential, rectifying means, a magnetic amplifier having a gating winding, with said terminal, said gating winding and said rectifying means being connected in a series circuit relationship to conduct when energized with alternating current only during the gating half cycle, potentiometer means connected to said terminals, a plurality of rectifying diodes operatively connected in parallel having one type of electrode commonly connected, each diode having a separate input terminal at the other electrode, a reset winding connected to said potentiometer means, a plurality of rectifying diodes, a reset winding connected to said potentiometer means and to said plurality of rectifying diodes, said plurality of rectifying diodes being poled so that said reset winding conducts only when energized with alternating current during the resetting half cycle, with the time period of conduction being determined by the smallest opposing input signal supplied to one of said input terminals, and means for amplifying the output of the gating winding.

References Cited in the file of this patent

UNITED STATES PATENTS

| | | |
|---|---|---|
| 2,712,065 | Elbourn et al. | June 28, 1955 |
| 2,725,549 | Dunnet | Nov. 29, 1955 |
| 2,862,197 | Ringelman et al. | Nov. 25, 1958 |
| 2,896,091 | Nuttall et al. | July 21, 1959 |
| 2,959,684 | Bonn | Nov. 8, 1960 |
| 2,967,949 | Loewe | Jan. 10, 1961 |
| 3,041,468 | Bonn et al. | June 26, 1962 |